(12) United States Patent
Moss (10) Patent No.: US 7,381,329 B1
(45) Date of Patent: Jun. 3, 2008

(54) BELT PRESS APPARATUS AND METHOD FOR HIGH SOLIDS CAPTURE AND HIGH SOLIDS CONTENT

(75) Inventor: William Harris Moss, 8921 NW. 51st Pl., Coral Springs, FL (US) 33067

(73) Assignee: William Harris Moss, Coral Springs, FL (US)

( * ) Notice: Subject to any disclaimer, the term of this patent is extended or adjusted under 35 U.S.C. 154(b) by 0 days.

(21) Appl. No.: 11/593,831

(22) Filed: Nov. 7, 2006

(51) Int. Cl.
*B01D 33/04* (2006.01)

(52) U.S. Cl. .................. 210/255; 210/386; 210/400; 210/401; 210/770; 210/783; 100/118; 100/126

(58) Field of Classification Search ................ None
See application file for complete search history.

(56) References Cited

U.S. PATENT DOCUMENTS

| | | | | |
|---|---|---|---|---|
| 1,764,456 A | * | 6/1930 | Mantius ................. 162/301 |
| 1,869,987 A | * | 8/1932 | Denburg ................ 100/153 |
| 2,057,312 A | * | 10/1936 | Richardson ............ 100/120 |
| 2,142,932 A | * | 1/1939 | Beard .................... 100/308 |
| 3,110,244 A | * | 11/1963 | Goodale ................. 100/120 |
| 3,315,370 A | * | 4/1967 | Hikosaka ................ 34/70 |
| 3,330,206 A | * | 7/1967 | Bechard ................. 100/153 |
| 3,381,609 A | * | 5/1968 | Malarkey, Jr. .......... 100/118 |
| 3,459,122 A | * | 8/1969 | Saller et al. ............ 100/118 |
| 3,605,607 A | * | 9/1971 | Gujer .................... 100/118 |
| 3,680,476 A | * | 8/1972 | Pfeiffer ................. 100/151 |
| 3,796,149 A | | 3/1974 | Heissenberger |
| 3,894,486 A | | 7/1975 | Sparowitz et al. |
| 3,942,433 A | | 3/1976 | Wohlfarter |
| 3,945,789 A | | 3/1976 | Boman |
| 3,951,809 A | * | 4/1976 | Kollmar ................. 210/241 |
| 3,994,774 A | * | 11/1976 | Halme et al. ........... 162/273 |
| 3,998,149 A | | 12/1976 | Malarkey |
| 4,053,419 A | | 10/1977 | Pav |
| 4,066,548 A | * | 1/1978 | Olson et al. ............ 210/160 |
| 4,142,461 A | * | 3/1979 | Bastgen ................. 100/118 |
| 4,147,101 A | | 4/1979 | Heissenberger et al. |
| 4,159,947 A | * | 7/1979 | Brooks et al. .......... 210/108 |
| 4,181,616 A | * | 1/1980 | Bahr .................... 210/297 |
| 4,303,523 A | * | 12/1981 | Ruppnig ................ 210/386 |
| 4,311,550 A | * | 1/1982 | Kerttula ................ 156/555 |
| 4,419,239 A | * | 12/1983 | Frankl .................. 210/413 |
| 4,475,453 A | * | 10/1984 | Davis ................... 100/118 |
| 4,492,155 A | * | 1/1985 | Wolkenstein ........... 100/118 |
| 4,517,148 A | * | 5/1985 | Churchland ............ 264/112 |
| 4,584,936 A | * | 4/1986 | Crandall et al. ........ 100/118 |
| 4,589,948 A | * | 5/1986 | Held .................... 156/555 |
| 4,613,293 A | * | 9/1986 | Gerhardt ............... 425/371 |
| 4,621,999 A | * | 11/1986 | Gerhardt ............... 425/371 |
| 4,622,894 A | * | 11/1986 | Crandall et al. ........ 100/118 |
| 4,636,345 A | * | 1/1987 | Jensen et al. .......... 264/122 |
| 4,647,417 A | * | 3/1987 | Bottger et al. ......... 264/120 |

(Continued)

*Primary Examiner*—Robert James Popovics (57) ABSTRACT

A belt press solid/liquid separation apparatus is provided for separating organic mixtures with substantial amounts of moisture to produce separated solids with solids content of 50-90% while retaining 99% of the incoming solids in the filter cake. Specifically, the invention incorporates a double-belt press apparatus with a non-permeable upper belt, a highly permeable lower belt, a wedge type zone with adjustable spring compression, and a means for re-screening belt press filtrate with either a single belt press or multiple belt presses configured as a multi-step cascade of belt presses.

5 Claims, 5 Drawing Sheets

U.S. PATENT DOCUMENTS

| | | | |
|---|---|---|---|
| 4,680,104 A * | 7/1987 | Kunkle et al. | 204/629 |
| 4,681,033 A * | 7/1987 | Crandall et al. | 100/118 |
| 4,718,843 A * | 1/1988 | Carlsson et al. | 425/371 |
| 4,836,100 A | 6/1989 | Johnson et al. | |
| 4,879,034 A | 11/1989 | Bastgen | |
| 4,923,384 A * | 5/1990 | Gerhardt | 425/371 |
| 4,961,862 A | 10/1990 | Janecek | |
| 4,986,910 A | 1/1991 | Uyama et al. | |
| 5,022,989 A | 6/1991 | Put | |
| 5,044,269 A * | 9/1991 | Bielfeldt | 100/38 |
| 5,066,399 A | 11/1991 | Sugihara et al. | |
| 5,082,562 A * | 1/1992 | Burger | 210/401 |
| 5,109,764 A | 5/1992 | Kappel et al. | |
| 5,133,872 A * | 7/1992 | Baldwin et al. | 210/709 |
| 5,240,609 A | 8/1993 | Langley | |
| 5,309,829 A * | 5/1994 | Gahlmann et al. | 100/118 |
| 5,366,626 A * | 11/1994 | Pierson | 210/216 |
| 5,456,832 A * | 10/1995 | Louden et al. | 210/386 |
| 5,520,530 A * | 5/1996 | Siempelkamp | 425/371 |
| 5,543,044 A * | 8/1996 | Louden et al. | 210/386 |
| 5,545,333 A * | 8/1996 | Louden et al. | 210/739 |
| 5,592,874 A | 1/1997 | Blauhut | |
| 6,003,684 A * | 12/1999 | Eickhoff et al. | 210/401 |
| 6,248,245 B1 * | 6/2001 | Thompson | 210/783 |
| 6,338,773 B1 * | 1/2002 | Sbaschnigg et al. | 162/300 |
| 6,454,102 B2 | 9/2002 | Thompson | |
| 7,051,882 B2 * | 5/2006 | Odmark et al. | 210/401 |

* cited by examiner

BELT PRESS APPARATUS AND METHOD FOR HIGH SOLIDS CAPTURE AND HIGH SOLIDS CONTENT

FIELD OF THE INVENTION

The present invention relates to the field of solids/liquid separation of organic mixtures with substantial amounts of moisture, e.g. livestock manures, food waste, whole stillage from ethanol processing or beer manufacturing, municipal wastewater sludge or other organic sludges and slurries. More particularly, the invention relates to a belt press design for thickening and dewatering mixtures to produce separated solids with solids content of 50%-90% while retaining 99% of the incoming solids in the filter cake.

BACKGROUND OF THE INVENTION

Various methods are known for removing liquid from mixtures of solids and liquid. In cases where solids consist primarily of compressible granular, fibrous or cellular material and the liquid is water, equipment selected for these applications have included belt presses, centrifuges, screw presses and vacuum filters.

There are technical and economic reasons for selecting a particular technology. Technical reasons for selecting a belt press include the ability to operate continuously; the ability to produce a dry filter cake with a target specification for % solids (or % moisture equal to 100%-% solids); and the ability to retain a high proportion of the incoming solids in the filter cake.

Numerous examples of belt presses are provided in the prior art—for example, U.S. Pat. Nos. 6,454,102 (Thompson), 5,592,874 (Blauhut), 5,545,333 (Louden et al.) and 4,681,033 (Crandall et al.). In general, a belt press has a frame with an upper belt and a lower belt. Both upper and lower belts are typically liquid permeable [see U.S. Pat. Nos. 6,454,102 (Thompson), 5,592,874 (Blauhut), 5,545,333 (Louden et al.), 5,109,764 (Kappel et al.), 4,986,910 (Uyama et al.), 4,961,862 (Janecek), 4,879,034 (Bastgen), 4,836,100 (Johnson et al.), 4,681,033 (Crandall et al.), 4,181,616 (Bahr), 4,147,101 (Heissenberger et al.), and 3,942,433 (Wohlfarter)], although U.S. Pat. No. 5,022,989 (Put) suggests a non-permeable upper belt combined with a permeable lower belt is more advantageous. U.S. Pat. No. 4,986,910 (Uyama et al.) discusses the limitation of twin permeable filter fabrics for dewatering sludges.

Belt presses can employ several stages at which different techniques are used to remove the liquid from a mixture of solids and liquid. The use of these different stages improves filtering efficiency throughout the belt filter press.

In a typical belt press with multiple stages, the mixture initially enters a gravity screening zone of the belt press where free water drains through the lower permeable belt by gravity. The gravity screening zone is used primarily to remove free water. At the end of the gravity screening zone, the mixture could be near 10% solids. U.S. Pat. Nos. 6,454,102 (Thompson), 5,545,333 (Louden et. al.), 5,240,609 (Langley), 5,066,399 (Sugihara et al.), 5,022,989 (Put), 4,986,910 (Uyama et al.), 4,961,862 (Janecek), 4,836,100 (Johnson et al.) and 4,181,616 (Bahr) describe belt presses with gravity screening zones.

After the gravity screening zone, the mixture of solids and liquids enters the wedge zone where the upper belt and the lower belt carrying the mixture of solids and liquid converge with one another, applying progressively increasing pressure as the mixture is compressed between the belts. The degree to which the mixture is compressed corresponds to the angle of convergence of the belts, also called the wedge angle. The wedge angle may be fixed at all times or mechanically adjusted prior to running the filter press to accommodate a particular mixture. Wedge zones are shown in U.S. Pat. Nos. 6,454,102 (Thompson), 5,545,333 (Louden et al.), 5,240,609 (Langley), 5,109,764 (Kappel et. al), 5,066,399 (Sugihara et al.), 5,022,989 (Put), 4,986,910 (Uyama et al.), 4,961,862 (Janecek), 4,879,034 (Bastgen), 4,836,100 (Johnson et al.), 4,681,033 (Crandall et al.), 4,181,616 (Bahr), 4,053,419 (Pav), 3,942,433 (Wohlfarter), 3,894,486 (Sparowitz et al.) and 3,796,149 (Heissenberger).

Some belt presses have a higher pressure zone wherein the upper and a lower belt follow a path between progressively smaller press rolls which may be either perforated or solid drums. The pressure imparted to the material between the upper and lower belts in the high pressure stage increases greatly from the largest perforated drum or solid roller to the smallest perforated drum or roller. High pressure zones are shown in U.S. Pat. Nos. 5,545,333 (Louden), 5,240,609 (Langley), 5,066,399 (Sugihara et. al), 4,986,910 (Uyama et. al), 4,879,034 (Bastgen), 4,836,100 (Johnson et al.), 4,681,033 (Crandall et al.), 4,181,616 (Bahr), 3,942,433 (Wohlfarter), and 3,796,149 (Heissenberger).

Some practitioners prefer the use of pressure plates instead of press rolls in the wedge zone and/or high pressure zone as described in U.S. Pat. Nos. 5,592,874 (Blauhut), 5,109,764 (Kappel et al.), 4,879,034 (Bastgen), 3,998,149 (Malarkey) and 3,945,789 (Boman).

U.S. Pat. No. 5,545,333 (Louden et. al) reported dried cake from a belt press is typically 30% solids.

U.S. Pat. No. 5,066,399 (Sugihara et. al) reported dried cake using a belt press designed with prior art was 70-75% moisture (25-30% solids) for an industrial mixture with initial feed of 90-95% moisture (5-10% solids); while a belt press incorporating the '399 patent produced a cake with 65-70% moisture (30-35% solids). It was also reported in the '399 patent that a belt press designed with prior art produced a dry cake with 80-90% moisture (10-20% solids) for a photo-etching mixture with initial feed moisture of 90-95% (5-10% solids), while the belt press designed with the '399 improvements produced a cake with 70-75% moisture (25-30% solids), U.S. Pat. No. 4,986,910 (Uyama et. al) reported ranges for belt press performance from a medium compression wedge zone are 65-85% moisture (15-35% solids); and belt press performance from a high compression dewatering zone is 60-65% moisture (35-40% solids). The '910 patent compared the performance for dewatering sewage sludge with prior art as 68.6% moisture (31.4% solids); while the performance for dewatering the same sewage sludge using a belt press with the '910 patent improvement was 65.5% moisture (34.5% solids); and a belt press with the '910 patent improvement with coke dust added produced 58.8% moisture in the dried cake (42.2% solids).

There are two problems with all prior art. First, many applications require higher % solids in the dried cake than can be produced using prior art. Some landfills refuse to accept sewage sludges that do not pass a minimum % solids content or stickiness test, requiring municipalities to add drying sand beds or find more costly land spreading options for sludge disposal. Dewatered livestock manures require addition of bulking agents before composting because moisture content of dewatered sludge is too high. Ethanol processors incur higher operating expense when the moisture of wet distillers' grains from processing whole stillage is too high.

Second, the percentage of incoming solids to the belt press retained in the filter cake is too low. Manure processing and food waste processing require a very high percentage of solids retained in the filter cake in order to meet effluent discharge water quality criteria or avoid contamination of downstream processes. Typical results for belt presses were not reported in the prior art but are available in public documents like (a) US EPA, Development Document for the Final Revisions to the National Pollutant Discharge Elimination System Regulation and the Effluent Guidelines for Concentrated Animal Feeding Operations, December 2002, (b) U.S. EPA, Biosolids Technology Fact Sheet, "Belt Filter Press", Document Number EPA 832-F-00-057, September 2000; and (c) North Carolina—Development of Environmentally Superior Technologies (EST) for Swine Waste Management 2003-2006, Technology Report—Solids separation/nitrification-denitrification/soluble phosphorus removal/solids processing system, July 2004 update available at http://www.cals.ncsu.edu/waste_mgt/smithfield_projects/phase1report04/A.9Super%20Soil%20final.pdf.

Credible, publicly available sources report a range of performance for percentage of incoming solids retained in the filter cake for belt presses as 40-85% which is either not acceptable or too costly for processing livestock manure, food waste, beer manufacturing, and other organic mixtures.

Therefore, the object of this invention is to provide a belt press design for thickening and dewatering to produce separated solids with solids content of 50-90% while retaining 99% of the incoming solids in the filter cake.

SUMMARY OF THE INVENTION

The present invention relates to a belt press with a gravity screening zone and a wedge zone to create pressure between the belts. In the gravity screening zone, liquid is allowed to drain through the lower permeable belt without pressure being applied by the upper belt. The wedge zone follows the gravity screening zone wherein the spacing between the two belts becomes increasingly narrow, causing pressure applied by the upper belt to increase as the spacing between the belts decreases.

In a further preferred embodiment, the upper belt assembly consists of a horizontal rectangular frame connected by four screw and bolt assemblies to the lower belt assembly at each corner of the upper belt assembly frame. The upper and lower belt assemblies are arranged in a wedge shape, with the gap between the belt frames decreasing in size as a mixture of solids and liquids is conveyed between the belts from the inlet of the wedge to the discharge of the belt press. The gap width is adjusted by a mechanical separator device such as a screw type separator at the four corners of the rectangular frame, with each corner independently adjustable to increase or decrease the compression in the wedge zone.

In a further preferred embodiment, each of the four adjustable separators at the four corners of the rectangular upper belt assembly may incorporate a spring compression assembly so that an increase in the flow of the mixture of solids and liquid will increase the compression in the wedge zone.

In a further preferred embodiment, the upper belt shall be a durable, synthetic material such as neoprene that is non-permeable to prevent liquid from passing. Filter cake that is not sufficiently dewatered in a single pass through the wedge zone will adhere to the upper non-permeable belt and be conveyed back to the inlet of the wedge zone for reprocessing in a second pas through the wedge zone.

In a further preferred embodiment, the lower belt shall be a plain woven square weave fabric made from synthetic material such as polyethylene that is highly permeable to allow liquid to pass through the belt. The plain woven square weave shall consist of synthetic cloth in which each warp thread and weft thread passes over and under the next adjacent thread. The square openings in the fabric shall range in size from 300 microns (U.S. Standard Sieve Size=50) to 1,000 microns (U.S. Standard Sieve Size=18). The open area of the fabric shall range in size from 20% at 300 micron square opening to 45% at 1,000 micron square opening.

In a further preferred embodiment, pressure plates are used to support the upper belt in the wedge zone and the lower belt in the gravity screening zone and wedge zone. The upper belt pressure plate is a solid metal plate. The lower belt pressure plate is a perforated metal plate with small diameter openings ranging in size from $\frac{3}{16}$-in. (0.50 cm) to $\frac{1}{4}$-in. (0.63 cm) and open area ranging from 25% to 40%.

The present invention was able to produce separated solids with 75-86% solids in the filter cake from flushed dairy manure (0.5-1.0% solids), scraped dairy manure (8-12% solids), raw municipal wastewater sludge (4% solids), and anaerobic digested municipal sludge (3% solids).

In a further preferred embodiment, the filtrate, consisting of liquid removed by the belt press along with residual solids passing through the belt, is re-screened in a second pass through the belt press to remove residual solids from the filtrate, thereby increasing the percentage of incoming solids retained in the filter cake. One of the means of re-screening uses a single belt press operating semi-continuously with a) a belt press; b) a tank to store dirty filtrate; and c) two operations per unit time interval. For time interval x, the mixture of solids and liquid is processed in the belt press as filtrate is collected and stored in the dirty filtrate tank. For time interval (x−1), dirty filtrate is re-screened through the belt press. The fraction x is a number between 0.3 and 0.7. A second means of re-screening uses two belt presses operating continuously in series, with the mixture of solids and liquid being processed in the first belt press, while the second belt press re-screens the filtrate from the first belt press. A third means of re-screening uses n belt presses operating continuously in a multi-stage cascade, with the mixture of solids and liquid being processed in the first belt press; the second belt press re-screening the filtrate from the first belt press; the third belt press re-screening the filtrate from the second belt press; and the $n^{th}$ belt press re-screening the filtrate from the (n−1) belt press. In this configuration, (n−1) belt presses perform successive re-screening of the filtrate from the first belt press. This embodiment can be applied to any belt press as well as the present invention.

The present invention was able to retain 99% of the incoming solids in the filter cake from the follow applications: flushed dairy manure (99.2%, 157 mg/l total suspended solids or TSS in the filtrate); scraped dairy manure (98.9%, 1,500 mg/l TSS in the filtrate), raw municipal wastewater sludge (99.5%, 225 mg/l TSS in the filtrate), and anaerobic digested municipal sludge (98.8%, 372 mg/l TSS in the filtrate).

In a further preferred embodiment, mixtures with solids content greater than 5% solids are processed without addition of any organic polymers or inorganic flocculants, hereinafter referred to as "additives". In the present invention, addition of organic polymers is only required for re-screening of filtrate. The additive dosage is typically 2-10 lb/ton of dry solids (1-5 kg/m$^3$ or 1-5 kg/1,000 kg), but the total quantity of additives is typically 90% less than the quantity that would be used if the all of the solids in the mixture were conditioned with additives prior to processing in a belt press.

In accordance with the above-noted objectives, the present invention describes a belt press apparatus for thickening and dewatering to produce separated solids with solids content of 50-90% while retaining 99% of the incoming solids in the filter cake.

DESCRIPTION OF THE PREFERRED EMBODIMENTS

Figure 1:
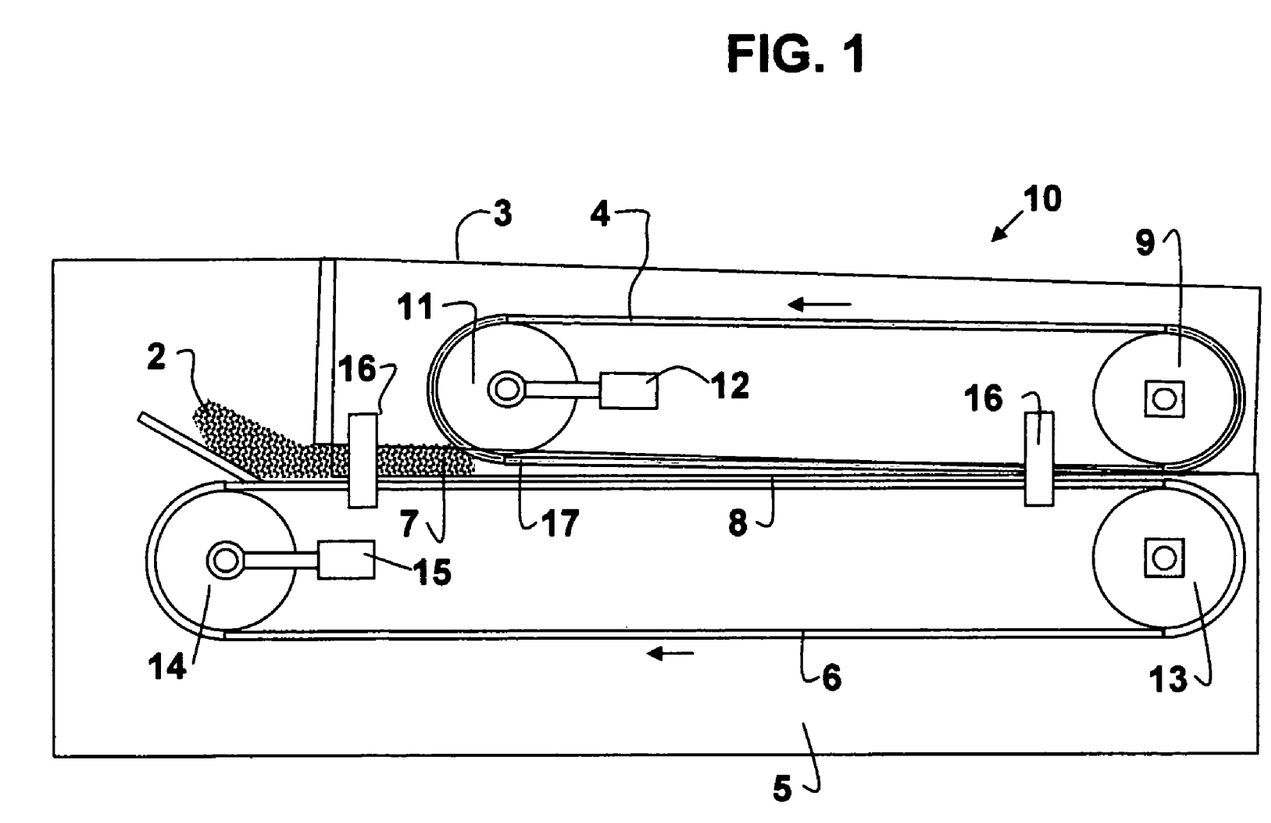
FIG. 1 is a cross-sectional view of the invention.

The subject of the invention is a belt press (10) for the separation of a mixture of solids and liquids (2) into a filter cake with high solids content and a means for retaining a high percentage of incoming solids in the filter cake so as to produce a separated liquid filtrate with as few solids as possible. Referring to FIG. 1, the belt press includes an upper belt assembly (3) with an endless non-permeable upper belt (4); a lower belt assembly (5) with an endless permeable lower belt (6); a gravity screening zone (7); and a wedge zone (8). In the gravity screening zone, liquid is allowed to drain through the lower permeable belt without pressure being applied by the upper belt. The wedge zone follows the gravity screening zone wherein the spacing between the two belts becomes increasingly narrow, causing pressure applied by the upper belt to increase as the spacing between the belts decreases.

The upper belt is supported by a discharge-end roller and drive (9) and an inlet side roller (11) that includes a belt tensioning mechanism (12) to adjust the tension in the belt. The lower belt is supported by a discharge-end roller and drive (13) and an inlet-side roller (14) that includes a belt tensioning mechanism (15).

The upper belt assembly (3) consists of a horizontal rectangular frame connected to the lower belt assembly at each corner of the upper belt assembly frame by four screw and bolt assemblies (16). The upper and lower belt assemblies are arranged in a wedge shape, with the gap between the belt frames decreasing in size as a mixture of solids and liquids is conveyed between the belts from the inlet of the wedge to the discharge of the belt press. The gap width (17) and corresponding gap angle is adjusted by a mechanical separator device such as a screw type separator at the four corners of the rectangular frame, with each corner independently adjustable to increase or decrease the compression in the wedge zone.

Figure 2A:
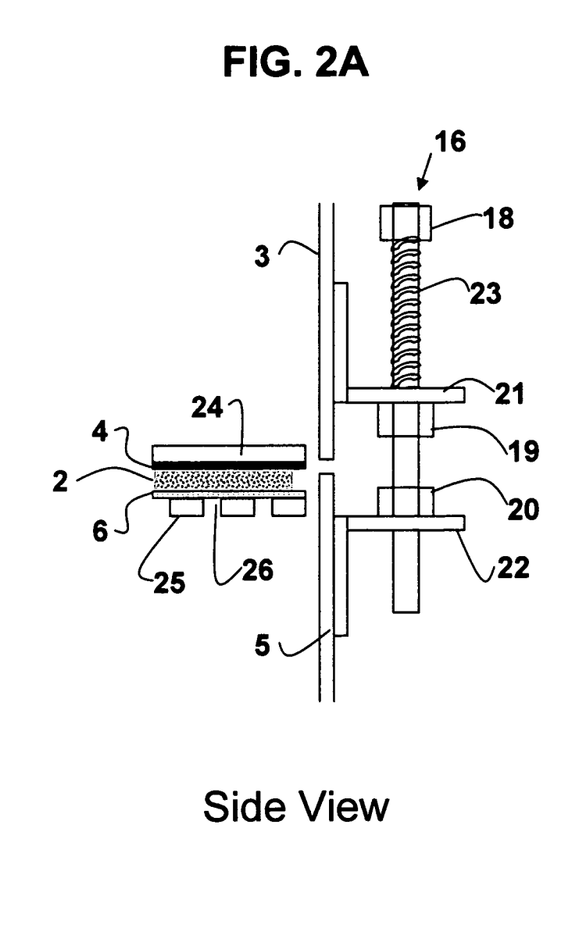
FIG. 2A and FIG. 2B are details showing the arrangement for adjusting the wedge zone gap width and compression pressure.
Figure 2B:
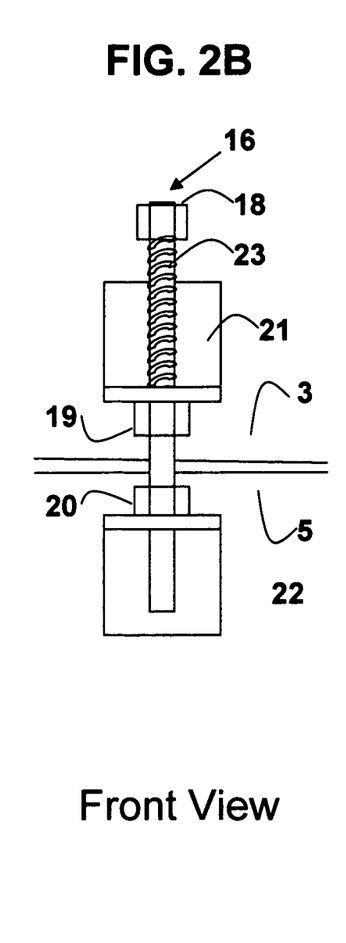

Referring to FIG. 2A and FIG. 2B, the screw type separator assembly (16) connects the upper belt assembly (3) to the lower belt assembly (5) and adjusts the gap and gap angle. The separator assembly consists of a bolt (18), an upper spacer nut (19), a lower spacer nut (20), upper frame bracket (21), lower frame bracket (22), and compression spring (23). Each of the four adjustable separators at the four corners of the rectangular upper belt assembly incorporates a spring compression assembly so that an increase in the flow of the mixture of solids and liquid will increase the compression in the wedge zone.

Figure 3:
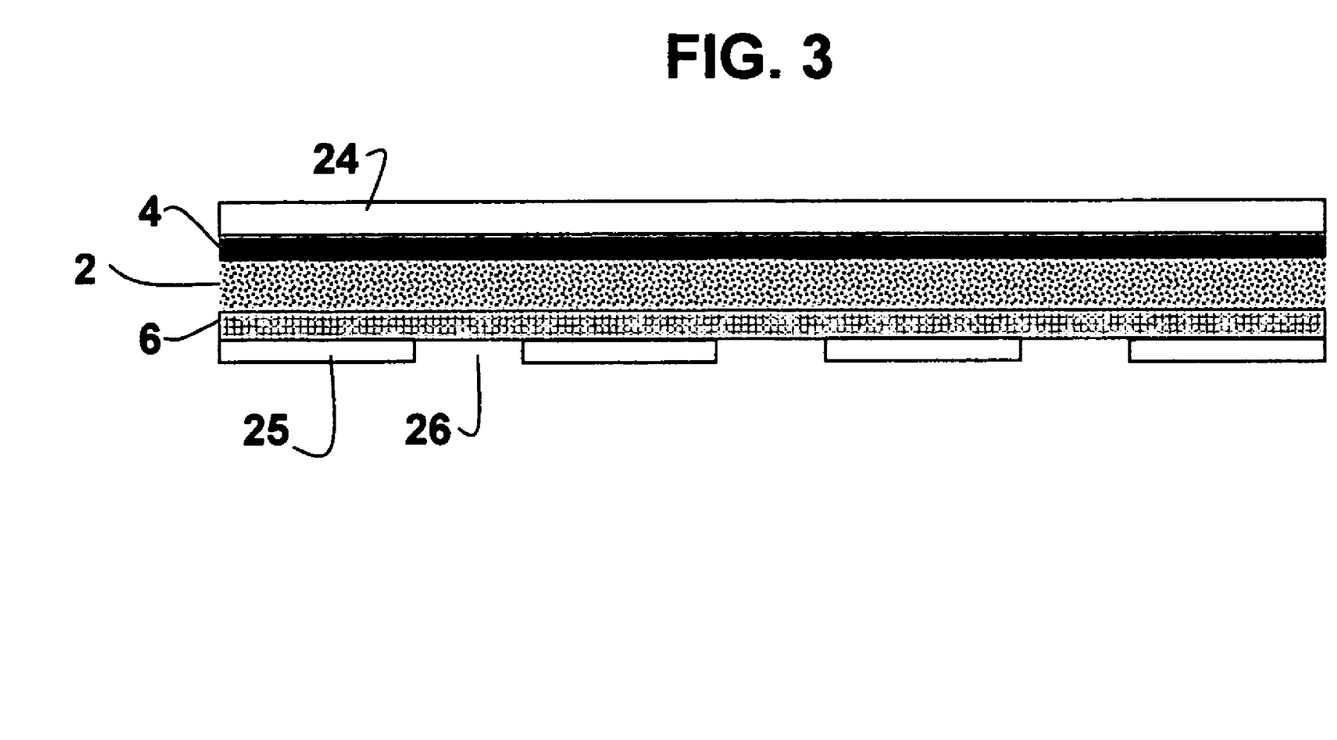
FIG. 3 is a detail showing the configuration of the upper and lower belt and pressure plates

Referring to FIG. 3, the belt support detail shows the upper belt is supported by a solid pressure plate (24), and the lower belt is supported by a perforated pressure plate (25) with small diameter openings (26) ranging in size from 3/16-in. (0.50 cm) to 1/4-in. (0.63 cm) and open area ranging from 25% to 40%. A majority of prior art practitioners use dual permeable filter fabrics wound around solid or perforated rollers. Uyama (U.S. Pat. No. 4,986,910) teaches that the maximum compression pressure for filter fabrics wound around rollers is 28 lb./in.$^2$ (2 kg/cm$^2$) or about 2 bars, due mostly to the limitation in the tensile strength of woven fiber fabrics to bridge the gaps between rollers without a carrier belt or other support. The use of pressure plates in the present invention makes it possible to have compression pressure as high as 140-210 lb./in.$^2$ (10-15 kg/cm$^2$ or 10-15 bars).

In a further preferred embodiment, the upper belt shall be a durable, synthetic material such as neoprene that is non-permeable to prevent liquid from passing. Filter cake that is not sufficiently dewatered in a single pass through the wedge zone will adhere to the upper non-permeable belt and be conveyed back to the inlet of the wedge zone for reprocessing in a second pas through the wedge zone, a phenomena first reported by Put (U.S. Pat. No. 5,022,989). This use of a non-permeable upper belt provides a self-regulating system to ensure that dewatered cake reaches a % solids content sufficiently high to separate cleanly from the from the lower permeable filter belt after dewatering. The wetter side of the filter cake will be the side in contact with the upper non-permeable belt. The dry side of the filter cake will be the side in contact with the lower permeable belt. If the filter cake is not dry enough to separate cleanly from either belt, the wet cake will adhere to the upper non-permeable belt and be returned to the inlet of the wedge zone for reprocessing.

In a further preferred embodiment, the lower belt shall be a plain woven square weave fabric made from synthetic material such as polyethylene that is highly permeable to allow liquid to pass through the belt. The plain square weave shall consist of synthetic cloth in which each warp thread and weft thread passes over and under the next adjacent thread. The square openings in the fabric shall range in size from 300 microns (U.S. Standard Sieve Size=50) to 1,000 microns (U.S. Standard Sieve Size=18). The open area of the fabric shall range in size from 20% at 300 micron square opening to 45% at 1,000 micron square opening. Prior art practitioners reported very few specifics about the materials, weave patterns, or mesh count used in their filter belts. In U.S. Pat. No. 5,022,989, Put reported the lower belt was a double weave linen textile fabric (two threads over one thread to form a double layer or tortuous path for solid particles to pass through the belt), with 20 wefts/cm (50 mesh opening) on each side of the double weave. In another application in manure processing, Put reported a range of mesh openings from 35 microns to 495 microns, but did not clarify which size was most effective. In U.S. Pat. No. 4,691,862, Janecek reported using a monofilament satin weave polyester or nylon, but did not specify the opening or weave pattern. The applicant is aware of no commercial belt press that uses simple, square weaves with wide openings.

Figure 4:
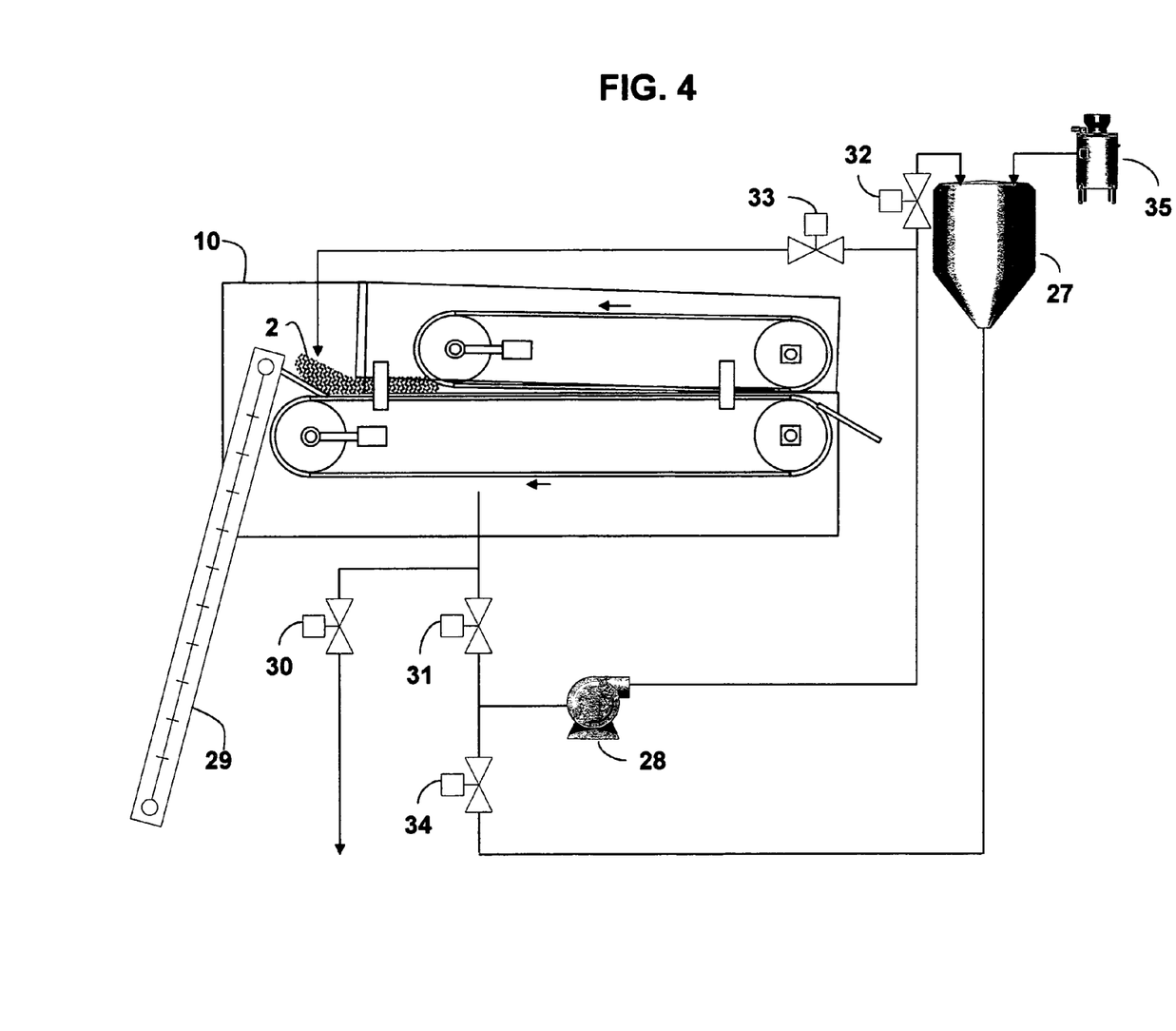
FIG. 4 is a schematic diagram showing the components and logic for re-screening with a single belt press.

In a further preferred embodiment, the filtrate, consisting of liquid removed by the belt press along with residual solids passing through the belt, is re-screened in a second pass through the belt press to remove residual solids from the filtrate, thereby increasing the % solids capture retained in the filter cake. Referring to FIG. 4, one of the means of re-screening uses a single belt press (10) operating semi-continuously, a dirty filtrate surge tank (27), a dirty filtrate pump (28), and a plurality of control valves to cycle the belt press between processing a mixture of solids and liquids and the re-screening the filtrate. The mixture of solids and liquids to be processed is fed to the belt press by a pump, a screw conveyor (29), or a belt conveyor. For time interval x, the mixture of solids and liquid is processed in the belt press as filtrate is collected and stored in the dirty filtrate tank. For time interval (x−1), dirty filtrate is re-screened through the belt press. The fraction x is a number between 0.3 and 0.7. During the processing of the mixture of solids and liquids, the clear filtrate valve (30) is closed; the belt press dirty filtrate to dirty filtrate pump valve (31) is open; the dirty filtrate to dirty filtrate surge tank valve (32) is open; the dirty filtrate to re-screen valve (33) is closed; the dirty filtrate surge tank to dirty filtrate pump valve (34) is closed; the screw conveyor (29) feeding the belt press is on; and the polymer make-up chemical feed system (35) is feeding organic anionic polymer to the dirty filtrate surge tank at the dosing rate of 2-5 lb/dry ton of solids (1 kg/1,000 kg). During the re-screening of dirty filtrate, the clear filtrate valve (30) is open; the belt press dirty filtrate to dirty filtrate pump valve (31) is closed; the dirty filtrate to dirty filtrate surge tank valve (32) is closed; the dirty filtrate to re-screen valve (33) is open; the dirty filtrate surge tank to dirty filtrate pump valve (34) is open; the screw conveyor (29) feeding the belt press is off; and the polymer make-up chemical feed system is off.

Figure 5:
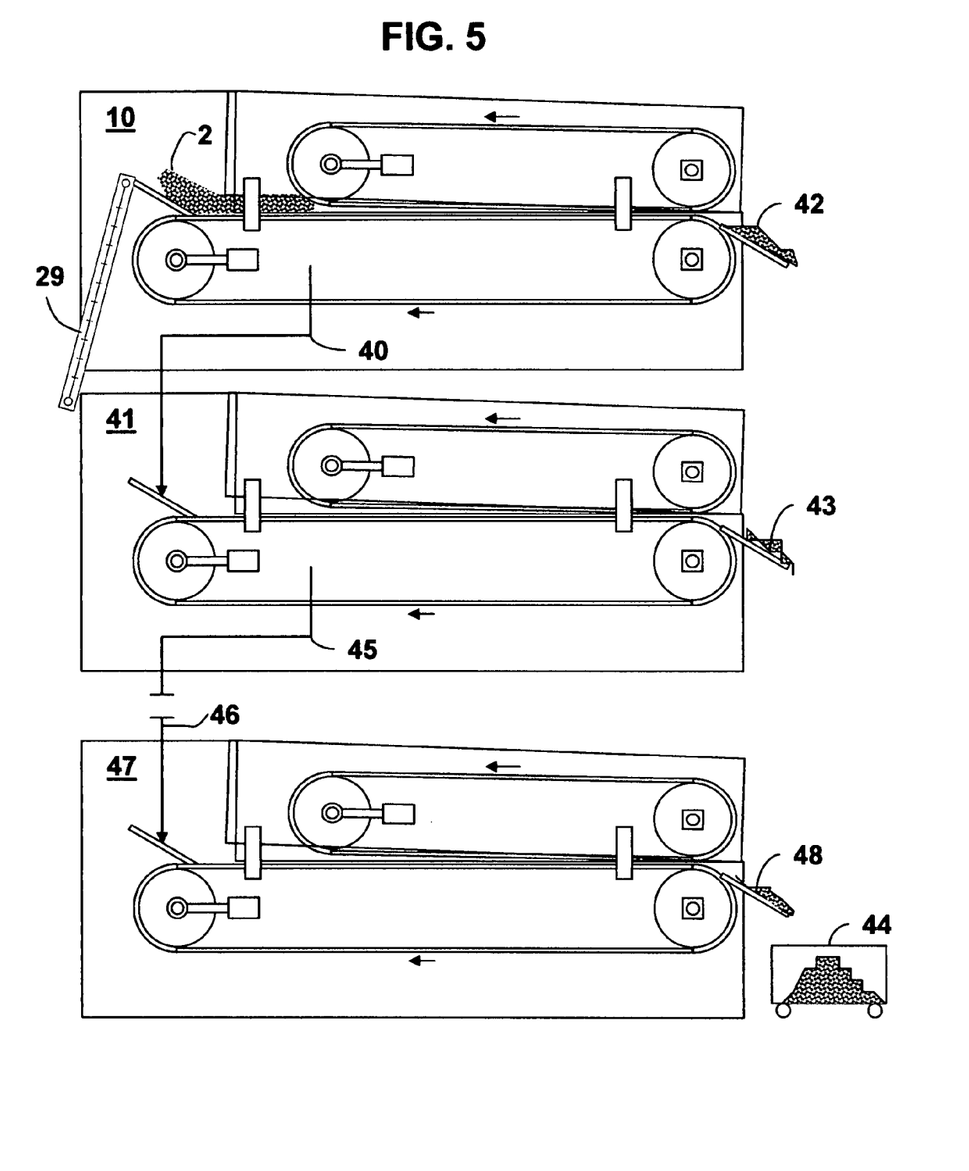
FIG. 5 is a schematic diagram of a multi-stage belt press with successive re-screening of filtrate.

A second means of re-screening uses two belt presses operating continuously in series, with the mixture of solids and liquid being processed in the first belt press while the second belt press re-screens the filtrate from the first belt press. Referring to FIG. 5, the mixture of solids and liquid (2) is fed to the first belt press (10) by a pump, a screw conveyor (29) or a belt conveyor, Dirty filtrate (40) flows by gravity or is pumped to a second belt press (41) for re-screening. The filter cake from the first belt press (42) and the filter cake from the second belt press (43) are combined in a common container (44).

A third means of re-screening uses n belt presses operating continuously in a multi-stage cascade. Referring again to FIG. 5, the dirty filtrate from the second belt press (45) flows by gravity or is pumped to a third belt press (not shown) for re-screening. The dirty filtrate from belt press (n−1) (46) flows by gravity or is pumped to belt press n (47) for re-screening. The filter cake from belt presses 3 through n are combined in a common container (44). In this configuration, (n−1) belt presses perform successive re-screening of the filtrate from the first belt press. The amount of filter cake produced by the second belt press is 1-10% of the quantity of filter cake produced by the first belt press; the amount of filter cake produced by the $n^{th}$ belt press is 1-10% of the amount of filter cake produced by the (n−1) belt press. This embodiment can be applied to any belt press as well as the present invention.

In a further preferred embodiment, mixtures with solids content greater than 5% solids are processed without addition of any organic polymers or inorganic flocculants, hereinafter referred to as "additives". It is the usual practice by users of belt presses to mix additives with the mixture of solids and liquids at a ratio of additives-to-dry solids in the mixture of 2-10 lb/dry ton (1-5 kg/m³ or 1-5 kg/1,000 kg).

In the present invention, additives are not necessary for dewatering mixtures with solids content greater than 5%. When processing mixtures with higher solids content, fine particles rapidly build up on the lower belt filter cloth and act as a pre-coat filter to hinder other solids from passing through the liquid-permeable lower belt. In the present invention, addition of organic polymers is only required for re-screening of filtrate. The additive dosage is typically the same—2-10 lb/ton of dry solids (1-5 kg/m³ or 1-5 kg/1,000 kg)—but the total quantity of additives is typically 90% less than the quantity that would be used if the all of the solids in the mixture were conditioned with additives prior to processing in a belt press.

The following examples in Table 1 illustrate the effectiveness of the present invention, where the first column is the type of waste; the second column is the % solids in the mixture applied to the belt press the third column is the % solids in the filter cake produced by the belt press, the fourth column is the Total Suspended Solids (TSS) in the separated liquid filtrate produced by the belt press, and the fifth column is the % solids capture in the filter cake produced by the belt press.

TABLE 1

Results for Present Invention

| Type of Mixture | % Solids to Belt Press | % Solids in Filter Cake | Filtrate TSS, mg/l | % Solids Capture |
|---|---|---|---|---|
| Flushed Dairy Manure | 2% | 86% | 157 | 99.2% |
| Scraped Dairy Manure | 12% | 79% | 1,500 | 98.9% |
| Raw Municipal Sewage Sludge (Primary + Trickling Filter) | 4% | 80% | 225 | 99.5% |
| Anaerobic Digested Municipal Sludge | 3% | 75% | 372 | 98.8% |

The following examples in Table 2 illustrate the prior art, where the first column is the type of waste; the second column is the source of the data, the third column is the % solids in the mixture applied to the belt press; the fourth column is the % solids in the filter cake produced by the belt press; and the fifth column is the % solids capture in the filter cake produced by the belt press. Data for TSS in the separated liquid filtrate was not reported.

TABLE 2

Results for Prior Art

| Type of Mixture | Source | % Solids to Belt Press | % Solids in Filter Cake | % Solids Capture |
|---|---|---|---|---|
| Livestock Manure | 1 | 1.5-12% | 22-35% | 40-60% |
| Municipal Sludge | 2 | 3-6% | 20-35% | Not Reported |
| Industrial Waste | 3 | 5-10% | 30-35% | Not Reported |
| Municipal Sludge | 4 | Not Reported | 35% | Not Reported |

Sources:
1. US EPA, Development Document for the Final Revisions to the National Pollutant Discharge Elimination System Regulation and the Effluent Guidelines for Concentrated Animal Feeding Operations, December 2002
2. US EPA, Biosolids Technology Fact Sheet, "Belt Filter Press", Document Number EPA 832-F-00-057, September 2000
3. U.S. Pat No. 5,066,399
4. U.S. Pat No. 4,986,910

The present invention was able to produce separated solids with 78-85% solids in the filter cake from flushed dairy manure (0.5-1.0% solids); scraped dairy manure (8-12% solids); raw municipal wastewater sludge (4% solids); and anaerobic digested municipal sludge (3% solids) as compared to 20-35% solids for prior art.

The present invention was able to retain 99% of the incoming solids in the filter cake from flushed dairy manure (99.2%, 157 mg/l total suspended solids or TSS in the filtrate); scraped dairy manure (98.9%, 1,500 mg/l TSS in the filtrate), raw municipal wastewater sludge (99.5%, 225 mg/l TSS in the filtrate), and anaerobic digested municipal sludge (98.8%, 372 mg/l TSS in the filtrate) as compared to 60-85% and 40,000-50,000 mg/l in the filtrate for prior art.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

I claim:

1. An apparatus for thickening and dewatering a mixture of solids and liquids with a belt filter press having an upper and lower belt, with a gravity screening zone and a wedge zone to create pressure between the belts, said apparatus being comprised of:
   (a) a lower permeable belt consisting of a woven, plain weave synthetic material with openings ranging in size from 300 microns-by-300 microns square (U.S. Standard Sieve Size 50) to 1,000 microns-by-1,000 microns square (U.S. Standard Sieve Size 18) and open area ranging in size from 20% at 300 micron square openings to 45% at 1,000 micron square opening to allow solids to be retained and liquid to pass through the lower permeable belt;
   (b) a rectangular upper belt assembly consisting of a rectangular frame, connected to the lower belt assembly by four screw and bolt assemblies at each corner of the rectangular frame;
   (c) an upper non-permeable belt consisting of a synthetic material;
   (d) a gravity screening zone of the belt filter press wherein a mixture of solids and liquids is allowed to drain through the lower permeable belt without pressure being applied by the upper belt; and
   (e) a wedge zone following the gravity screening zone where the spacing between the two belts becomes increasingly narrow as the mixture of solids and liquid is conveyed along the belt press, wherein the pressure applied by the upper non-permeable belt increases as the spacing between the belts decreases, and
   (f) a means for adjusting the spacing between the upper non-permeable belt and the lower permeable belt by mechanical means at each corner of the rectangular upper assembly to increase or decrease the compression in the wedge zone, and
   (g) a means for adjusting the compression pressure at the four corners of the rectangular upper belt assembly, so that an increase in the flow of the mixture of solids and liquids will increase the compression in the wedge zone.

2. The apparatus as recited in claim 1, wherein mixtures of solids and liquids with solids content greater than 5% solids are processed without any addition of organic polymers of inorganic flocculants.

3. The apparatus as recited in claim 2, wherein the solids content of the solids separated from the mixture of solids and liquid is 50-90%.

4. The apparatus as recited in claim 3, wherein the filtrate from processing mixtures of solids and liquids is re-screened in a second pass through the gravity screening and wedge zone, said means for re-screening comprising either:
   (a) a single belt press having an upper and lower belt, as described in claims 1-3, said configuration having two operations per unit time interval, with x fraction of the time interval processing a mixture of solids and liquids with solids content greater than 5% solids, and (1−x) fraction of the time interval processing the filtrate from the mixture of solids and liquids with solids content greater than 5%, and x is a number between 0.3 and 0.7, or
   (b) two belt presses, each having an upper and lower belt, as described in claims 1-3, with the inlet to the first belt press being a mixture of solids and liquid with solids content greater than 5%, and the inlet to the second belt press being the liquid filtrate removed by the first belt press, wherein the two belt presses operate continuously, with the first belt press performing the primary dewatering of liquid from the mixture of solids and liquid, and the second belt press performing the re-screening of the filtrate from the first belt press, or
   (c) multiple belt presses, each having an upper and lower belt as described in the claims 1-3, configured as a multi-stage cascade of belt presses with n stages, with the inlet to the first belt press being a mixture of solids and liquid with solids content greater than 5%, the inlet to the second belt press being the liquid filtrate removed by the first belt press, the inlet to the third belt press being the liquid filtrate removed from the second belt press, and the inlet to belt press n being the liquid filtrate removed from belt press (n−1), wherein all belt presses operate simultaneously and continuously, with the first belt press performing the primary dewatering of liquid from the mixture of solids and liquid belt presses (n−1) performing successive re-screening of the filtrate from the first belt press.

5. The apparatus as recited in claim 4, wherein 99% of the incoming solids are retained in the filter cake produced by the belt press.

* * * * *